(12) United States Patent  
Kim et al.

(10) Patent No.: US 11,494,646 B2
(45) Date of Patent: Nov. 8, 2022

(54) NEURAL NETWORK SYSTEM FOR PERFORMING LEARNING, LEARNING METHOD THEREOF, AND TRANSFER LEARNING METHOD OF NEURAL NETWORK PROCESSOR

(71) Applicant: SAMSUNG ELECTRONICS CO., LTD., Suwon-si (KR)

(72) Inventors: Jaegon Kim, Suwon-si (KR); Sangsoo Ko, Suwon-si (KR); Kyoungyoung Kim, Suwon-si (KR); Byeoungsu Kim, Suwon-si (KR); Sanghyuck Ha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 530 days.

(21) Appl. No.: 16/701,841

(22) Filed: Dec. 3, 2019

(65) Prior Publication Data

US 2020/0356853 A1 Nov. 12, 2020

(30) Foreign Application Priority Data

May 8, 2019 (KR) .......................... 10-2019-0053887

(51) Int. Cl.
*G06N 3/08* (2006.01)
*G06N 3/04* (2006.01)

(52) U.S. Cl.
CPC ............. *G06N 3/08* (2013.01); *G06N 3/0472* (2013.01)

(58) Field of Classification Search
CPC ........ G06N 3/08; G06N 3/0472; G06N 3/063; G06N 3/04; G06N 3/0454; G06N 3/084; G06K 9/6268
See application file for complete search history.

(56) References Cited

U.S. PATENT DOCUMENTS 9,477,929 B2 10/2016 He et al.
9,715,660 B2 7/2017 Parada San Martin et al.
(Continued)

OTHER PUBLICATIONS

A. Brock, T. Lim, J. Ritchie, and N. Weston, "Freezeout: Accelerate training by progressively freezing layers," OPTML 2017 : 10th NIPS Workshop on Optimization for Machine Learning, Dec. 2017.

*Primary Examiner* — Thien Nguyen
(74) *Attorney, Agent, or Firm* — Volentine, Whitt & Francos, PLLC

(57) ABSTRACT

A neural network system includes a processor and a memory. The processor is configured to perform learning including multiple learning iterations on multiple layers, to determine at least one layer in which the learning is interrupted among the multiple layers. The determination of the at least one layer in which the learning is interrupted is based on a result of comparing for each of the multiple layers a distribution of first weight values resulting from a first learning iteration with a distribution of second weight values resulting from a second learning iteration. The processor is also configured to perform a third learning iteration in layers except the at least one layer for which interruption of the learning has been determined. The memory stores first distribution information of the first weight values and second distribution information of the second weight values and is configured to provide the first distribution information and the second distribution information to the processor when the second learning iteration is completed.

20 Claims, 15 Drawing Sheets

(56) References Cited

U.S. PATENT DOCUMENTS

| | | |
|---|---|---|
| 2011/0320387 A1 | 12/2011 | He et al. |
| 2016/0224892 A1 | 8/2016 | Sawada et al. |
| 2016/0342887 A1* | 11/2016 | TIELEMAN .......... G06N 3/084 |
| 2017/0024641 A1 | 1/2017 | Wierzynski |
| 2018/0253636 A1 | 9/2018 | Lee et al. |
| 2018/0276539 A1 | 9/2018 | Lea |
| 2018/0314940 A1* | 11/2018 | Kundu ................. G06N 3/0454 |
| 2021/0081798 A1* | 3/2021 | Cho ....................... G06N 3/04 |
| 2021/0110264 A1* | 4/2021 | Campos ............... G06N 3/0454 |
| 2021/0117792 A1* | 4/2021 | Ahuja ..................... G06N 3/08 |
| 2021/0303988 A1* | 9/2021 | Kaplan ................ G06N 3/0454 |

\* cited by examiner

BACK PROPAGATION

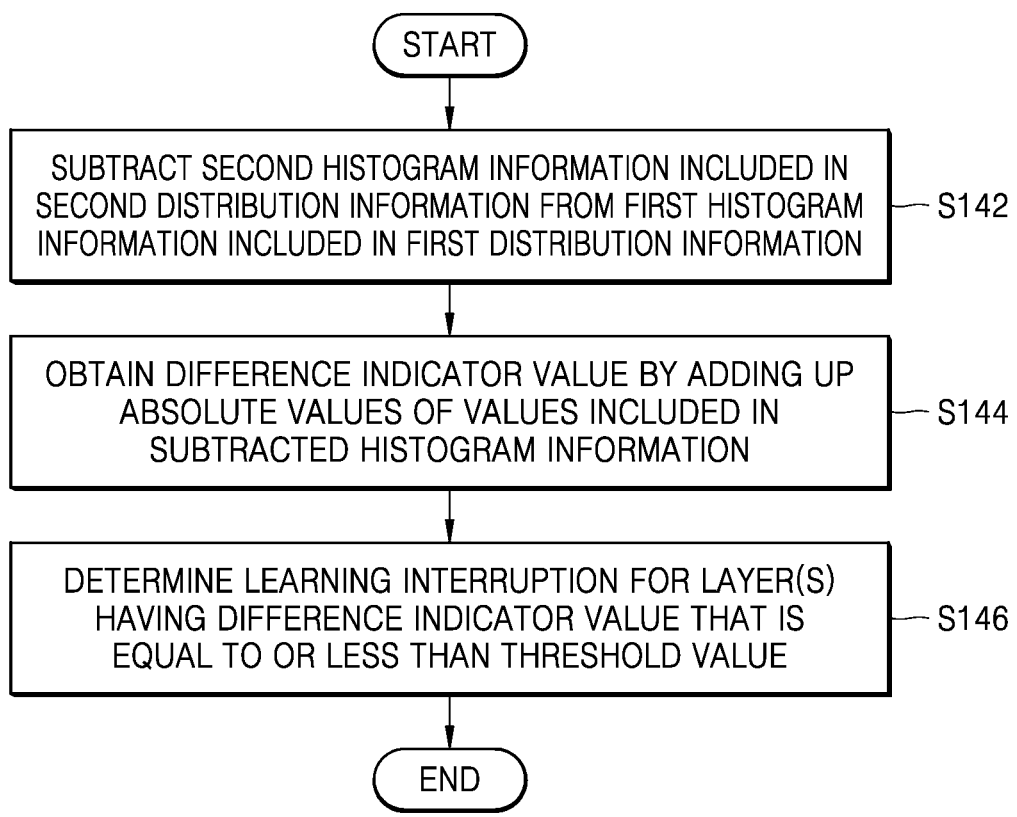

NEURAL NETWORK SYSTEM FOR PERFORMING LEARNING, LEARNING METHOD THEREOF, AND TRANSFER LEARNING METHOD OF NEURAL NETWORK PROCESSOR

CROSS-REFERENCE TO RELATED APPLICATION

This U.S. non-provisional patent application claims the benefit of priority under 35 U.S.C. § 119 to Korean Patent Application No. 10-2019-0053887, filed on May 8, 2019 in the Korean Intellectual Property Office, the disclosure of which is incorporated herein in its entirety by reference.

BACKGROUND

1. Technical Field

The present disclosure relates to a neural network system, a learning method thereof, and a transfer learning method of a neural network processor. More particularly, the present disclosure relates to a neural network system for performing learning, a learning method thereof, and a transfer learning method of a neural network processor.

2. Description of the Related Art

A neural network refers to a computational architecture which is a model of a biological brain. As neural network technology has recently been developed, there has been much research into analyzing input data and obtaining output information using a neural network device, which uses at least one neural network model, in various kinds of electronic systems.

A neural network may provide mapping between input patterns and output patterns, which means that the neural network has a learning ability. A neural network has a generalizing ability, by which the neural network may provide a relatively correct output with respect to an input pattern that has not been used for learning, based on a learning result of the learning ability.

Training of a neural network to obtain learning results is important and takes a significant amount of time in neural network systems. Therefore, techniques for increasing a learning speed of a neural network are required.

SUMMARY

According to aspects of the present disclosure, a neural network system, a learning method thereof, and a transfer learning method of a neural network processor are provided, by which total time taken for learning, and more particularly, for transfer learning, is reduced and a transfer learning speed is increased.

According to an aspect of the present disclosure, a neural network system includes a neural network processor and a memory. The neural network processor is configured to perform learning including multiple learning iterations on a plurality of layers, and to determine at least one layer in which the learning is interrupted among the plurality of layers. The determination of the at least one layer in which the learning is interrupted is based on a result of comparing, for each of the plurality of layers, a distribution of first weight values resulting from a first learning iteration with a distribution of second weight values resulting from a second learning iteration subsequent to the first learning iteration.

The neural network processor is also configured to perform a third learning iteration subsequent to the second learning iteration on the plurality of layers except the at least one layer for which interruption of the learning has been determined among the plurality of layers. The memory is configured to store first distribution information regarding the distribution of the first weight values and second distribution information regarding the distribution of the second weight values and is configured to provide the first distribution information and the second distribution information to the neural network processor when the second learning iteration is completed.

According to another aspect of the present disclosure, a learning method of a neural network system includes a plurality of learning iterations on a plurality of layers. The learning method includes storing first weights resulting from an N-th learning iteration in a memory and determining at least one layer in which learning is interrupted among the plurality of layers based on first weight values included in the first weights and second weight values included in second weights resulting from an (N−1)-th learning iteration. The learning method of the neural network system also includes performing an (N+1)-th learning iteration on the plurality of layers except the at least one layer for which interruption of the learning has been determined among the plurality of layers.

According to a further aspect of the present disclosure, a transfer learning method of a neural network processor includes a plurality of learning iterations on a plurality of layers. The transfer learning method includes storing first weight values resulting from a first learning iteration in a memory outside the neural network processor; and storing second weight values resulting from a second learning iteration in the memory. The second learning iteration is subsequent to the first learning iteration. The transfer learning method also includes receiving first distribution information of the first weight values and second distribution information of the second weight values from the memory and determining at least one layer in which the learning is interrupted among the plurality of layers based on the first distribution information and the second distribution information. The transfer learning method further includes performing a third learning iteration on the plurality of layers except the at least one layer for which interruption of the learning has been determined among the plurality of layers.

BRIEF DESCRIPTION OF THE DRAWINGS

Embodiments of the inventive concept(s) of the present disclosure will be more clearly understood from the following detailed description taken in conjunction with the accompanying drawings in which:

FIG. 10 illustrates another flowchart of a learning method of a neural network system, according to an example embodiment;

DETAILED DESCRIPTION OF THE EMBODIMENTS

Hereinafter, embodiments will be described in detail with reference to the attached drawings.

Figure 1:
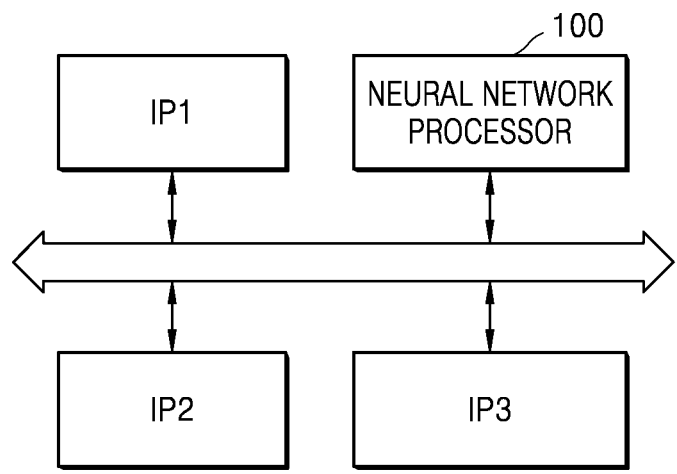
FIG. 1 illustrates an electronic system, according to an example embodiment.

FIG. 1 illustrates an electronic system 10, according to an example embodiment. The electronic system 10 may analyze input data in real time based on a neural network, obtain valid information, and identify a situation or control elements of an electronic device equipped with the electronic system 10 based on the valid information. Valid information may be sound, reliable, trustworthy and/or otherwise useful/usable information obtained based on applying the neural network to the input data. A situation may be identified by identifying circumstances and/or characteristics of where, when, how, why and/or by whom the input data it obtained. For example, the electronic system 10 may be implemented in or otherwise applied to a drone, a robot device such as an advanced driver assistance system (ADAS), a smart television (TV), a smart phone, a medical device, a mobile device, an image display, a measuring device, an Internet of things (IoT) device, etc. The electronic system 10 may be mounted on or incorporated into any of a variety of different types of electronic devices. The electronic system 10 using a neural network may be referred to as a neural network system.

The electronic system 10 may include at least one intellectual property (IP) block and a neural network processor 100. For example, the electronic system 10 may include a first IP block IP1, a second IP block IP2, a third IP block IP3 and the neural network processor 100. The acronym "IP" represents the term "intellectual property" and the term "IP block" references unique circuits and components of circuits that may each be separately subject to intellectual property protection. The term "IP block" may be synonymous with similar terms such as "IP circuit" when used in the descriptions herein.

The electronic system 10 may include various kinds of IP blocks. For example, IP blocks may include a processing unit, multiple cores included in a processing unit, a multi-format codec (MFC), a video module, a three-dimensional (3D) graphics core, an audio system, a display driver, volatile memory, non-volatile memory, a memory controller, an input and output interface block, cache memory, etc. For example, a processing unit as an IP block may be or include a processor that executes software instructions or an application-specific integrated circuit (ASIC). A video module as an IP block may be or include a camera interface, a Joint Photographic Experts Group (JPEG) processor, a video processor, and/or a mixer. Each of the first IP block IP1, second IP block IP2 and third IP block IP3 may include at least one selected from the various kinds of IP blocks.

A connection method based on a system bus may be used as a technique for connecting IP blocks. For example, an advanced microcontroller bus architecture (AMBA) protocol of Advanced RISC Machines (ARM) Ltd. may be used as a standard bus protocol. The AMBA protocol may include bus types such as advanced high-performance bus (AHB), advanced peripheral bus (APB), advanced extensible interface (AXI), AXI4, and AXI coherency extensions (ACE). Among these bus types, AXI may be used as an interface protocol between IP blocks and may provide a multiple outstanding address function and a data interleaving function. Besides the above, other types of protocols such as uNetwork of SONICs Inc., CoreConnect of IBM, and open core protocol of OCP-IP's may be used.

The neural network processor 100 may generate a neural network, train or implement learning of and/or by a neural network, perform an operation based on input data and generate an information signal based on an operation result, or retrain a neural network. Neural networks may be modelled based on various kinds of neural network models, such as a convolutional neural network (CNN) such as GoogLeNet, AlexNet, or VGG network, a region with CNN (R-CNN), a region proposal network (RPN), a recurrent neural network (RNN), a stacking-based deep neural network (S-DNN), a state-space dynamic neural network (S-SDNN), a deconvolution network, a deep belief network (DBN), a restricted Boltzmann machine (RBM), a fully convolutional network, a long short-term memory (LSTM) network, and a classification network. However, neural networks and neural network models consistent with the description herein are not limited thereto. The neural network processor 100 may include at least one processor that performs operations according to one or more neural network models. The neural network processor 100 may include separate memory that stores programs corresponding to respective neural network models. The neural network processor 100 may be referred to as a neural network processing device, a neural network integrated circuit, or a neural network processing unit (NPU).

The neural network processor 100 may receive various kinds of input data from at least one IP block through a system bus and may generate an information signal based on the input data. For example, the neural network processor 100 may generate an information signal by performing a neural network operation on input data, and the neural network operation may include a convolution operation. The information signal generated by the neural network processor 100 may include at least one selected from various kinds of recognition signals such as a voice recognition signal, a thing recognition signal, an image recognition signal, and a biometric recognition signal. For example, the neural network processor 100 may receive frame data included in a video stream as input data and may generate a recognition signal with respect to a thing, which is included in an image represented by the frame data, from the frame data. However, embodiments are not limited to video streams as input data or the above-noted types of recognition signals as generated information signals. The neural network processor 100 may receive various kinds of input data and generate a recognition signal based on the input data. For this operation, the neural network processor 100 may implement learning of and/or by a neural network, which will be described in detail with reference to FIG. 3.

According to an example embodiment, the neural network processor 100 of the electronic system 10 may perform transfer learning. Transfer learning may refer to learning of and/or by a neural network applied to a second model using a neural network applied to a first model. For example, transfer learning may include learning of and/or by a neural network applied to a specific model using a neural network algorithm or weights that were each applied to an existing trained general model. This will be described in detail with reference to FIG. 4. In an embodiment, transfer learning may include multiple learning iterations in multiple layers. Since transfer learning is performed based on an existing trained model, weights corresponding to some of multiple layers may have values that are saturated after less learning iterations than a total number of learning iterations. By way of explanation, if output results from a layer are limited to a range, saturation may occur when the output results from the layer reach the extremity in the range and will not change in subsequent iterations. A simple example of saturation for an individual processing element in a layer is a process that compares a first input value to a second retained value retained by the individual processing element in the layer. The process may discard the first input value if the first input value is lower than the second retained value and output the second retained value as the output result. The process may replace the second retained value with the first input value as a new retained value if the first input value is higher than the second retained value and output the first input value as the new retained value as the output result. If the retained value and the output result are both limited between 0 and 100, once the retained value is 100 no subsequent processing by the processing element can increase the retained value and the output result to be higher than 100, and the logic of the processing element requires that the retained value and the output result do not decrease in any iteration. Thus, an operation result from the processing element is saturated once the output result is equal to 100 in this example. The above-description of logic that can result in saturation for a processing element in a layer is merely exemplary, and an output result of a processing element in a layer may become saturated in other ways. For the purposes of the description herein, saturation may be considered a state where further processing by a layer will not satisfactorily change the operation result from the layer from one iteration to the next.

Saturation is only an example of a reason for which learning may be deemed to be interrupted. As explained below, learning may be deemed interrupted when the operation result from a layer does not change or even if the operation result from the layer is changed from one iteration to the next but is not changed satisfactorily, such as when the change is below a threshold. That is, the interruption itself may be that time and resources are wasted for an iteration in a layer that is not productive, such that the overall process is otherwise interrupted while the time and resources are wasted in the iteration in the unproductive layer. Additionally, the basis for determining that learning is interrupted is not limited to one aspect of the output from a layer such as a single value or the output from a single processing element in a layer. Rather the change or relative absence of change may be reflected in distribution statistics with multiple values from multiple processing elements and distribution histograms which reflect distributions of weight values output from multiple processing elements of a layer at each iteration.

According to an example embodiment, the neural network processor 100 of the electronic system 10 may determine a layer in which learning will be interrupted based on weight values resulting from a current learning iteration and weight values resulting from a previous learning iteration. The neural network processor 100 may perform a subsequent learning iteration only in layers excluding the layer for which interruption of the learning is determined. For example, the neural network processor 100 may determine a layer in which learning is to be interrupted based on a result of comparing the distribution of weight values resulting from a current learning iteration with the distribution of weight values resulting from a previous learning iteration. The neural network processor 100 may perform a subsequent learning iteration only in layers excluding the layer for which interruption of the learning is determined. Accordingly, the neural network processor 100 may perform the subsequent learning iteration more quickly, and therefore, the total transfer learning time may be reduced. Furthermore, a transfer learning speed of the neural network processor 100 may be increased. Transfer learning of and/or by the neural network processor 100 will be described in more detail with reference to the drawings below.

The description above for FIG. 1 describes a comparison of weight values between two iterations. The current and previous iterations do not have to be immediately sequential, and instead the comparison may be between weight values of a third iteration and a first iteration, with a second iteration intervening between the first iteration and the third iteration not being part of the comparison. Additionally, comparisons may be performed more than once, and between more than two layers. For example, a comparison may be made between weight values from a second iteration and weight values from a first iteration, between weight values from a third iteration and weight values from the second iteration, and between weight values from the third iteration and weight values from the first iteration. A determination to perform additional comparisons may also be dynamically made when, for example, an initial comparison identifies substantial changes in the weight values, but the substantial changes are or appear to be less substantial over time so that increasing comparisons are deemed warranted since saturation is imminently expected.

Figure 2:
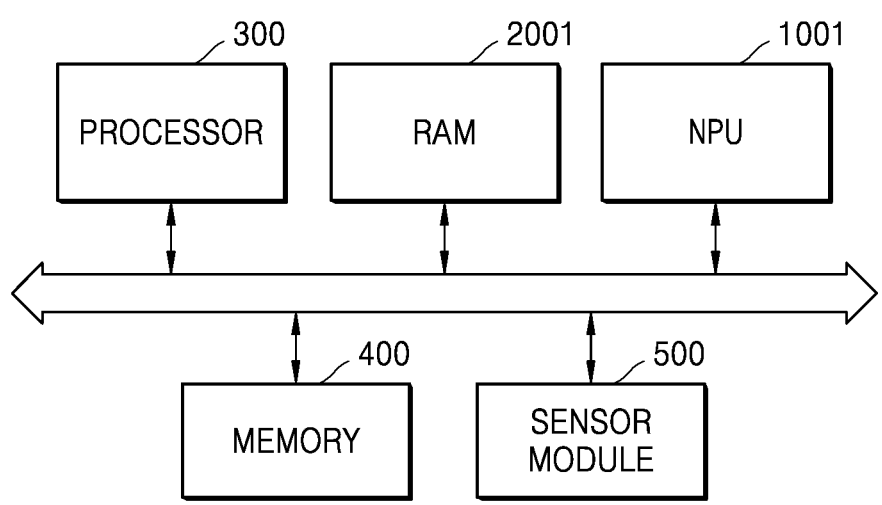
FIG. 2 illustrates another electronic system, according to an example embodiment.

FIG. 2 illustrates another electronic system 20, according to an example embodiment. In particular, FIG. 2 illustrates a specified embodiment consistent with the electronic system 10 of FIG. 1. Redundant descriptions of the electronic system 10 that have been made with reference to FIG. 1 will be omitted.

The electronic system 20 may include an NPU 1001, a RAM 2001 (random access memory), a processor 300, memory 400, and a sensor module 500. The NPU 1001 may correspond to the neural network processor 100 in FIG. 1.

The RAM 2001 may temporarily store programs, data, or instructions. Programs and/or data stored in the memory 400 may be temporarily loaded to the RAM 2001 according to the control of the processor 300 or booting code. The RAM 2001 may be implemented using memory such as dynamic RAM (DRAM) or static RAM (SRAM).

The processor 300 may control all operations of the electronic system 20. For example, the processor 300 may be implemented as a central processing unit (CPU). The processor 300 may include a single core or multiple cores. The processor 300 may process or execute programs and/or data, which are stored in the RAM 2001 and the memory 400. For example, the processor 300 may control functions of the electronic system 20 by executing programs stored in the memory 400.

The memory 400 is storage for storing data and may store, for example, an operating system (OS), various programs, and various data. The memory 400 may include DRAM but is not limited thereto. The memory 400 may include at least one selected from volatile memory and non-volatile memory. The non-volatile memory may include read-only memory (ROM), programmable ROM (PROM), electrically programmable ROM (EPROM), electrically erasable programmable ROM (EEPROM), flash memory, phase-change RAM (PRAM), magnetic RAM (MRAM), resistive RAM (RRAM), and ferroelectric RAM (FeRAM). The volatile memory may include DRAM, SRAM, synchronous DRAM (SDRAM), PRAM, MRAM, RRAM, and FeRAM. In an embodiment, the memory 400 may include at least one selected from a hard disk drive (HDD), a solid state drive (SSD), compact flash (CF) memory, secure digital (SD) memory, micro-SD memory, mini-SD memory, extreme digital (xD) memory, and a memory stick.

The sensor module 500 may collect surrounding information of the electronic system 20. The sensor module 500 may sense or receive an image signal from outside the electronic system 20 and may convert the image signal into image data, e.g., an image frame. For this operation, the sensor module 500 may include at least one sensing device selected from various sensing devices, such as an image pickup device, an image sensor, a light detection and ranging (LIDAR) sensor, an ultrasonic sensor, an infrared sensor, a gyroscope, an accelerometer, a thermometer, and a compass. The sensor module 500 also or alternatively may receive a sensing signal from the sensing device. In an embodiment, the sensor module 500 may provide the image frame to the NPU 1001. For example, the sensor module 500 may include an image sensor and may generate a video stream by capturing surroundings of the electronic system 20 and sequentially provide consecutive image frames in the video stream to the NPU 1001.

According to an example embodiment, the NPU 1001 of the electronic system 20 may perform transfer learning. Transfer learning may refer to learning of and/or by a neural network applied to a second model using a neural network applied to a first model. For example, transfer learning may include learning of and/or by a neural network applied to a specific model using a neural network algorithm or weights that were each applied to an existing trained general model. This will be described in detail with reference to FIG. 4. In an embodiment, transfer learning may include multiple learning iterations in multiple layers. Since transfer learning is performed based on an existing trained model, weights corresponding to some of multiple layers may have values that are saturated after less learning iterations than a total number of learning iterations.

According to an example embodiment, the NPU 1001 of the electronic system 20 may determine a layer in which learning will be interrupted based on weight values resulting from a current learning iteration and weight values resulting from a previous learning iteration. The NPU 1001 may perform a subsequent learning iteration only in layers excluding the layer for which interruption of the learning is determined. For example, the NPU 1001 may determine a layer in which learning will be interrupted based on a result of comparing the distribution of weight values resulting from a current learning iteration with the distribution of weight values resulting from a previous learning iteration. The NPU 1001 may perform a subsequent learning iteration only in layers excluding the layer for which interruption of the learning is determined. Accordingly, the NPU 1001 may perform the subsequent learning iteration more quickly, and therefore, the total transfer learning time may be reduced. Furthermore, a transfer learning speed of the NPU 1001 may be increased. Transfer learning of and/or by the NPU 1001 will be described in more detail with reference to the drawings below.

Figure 3:
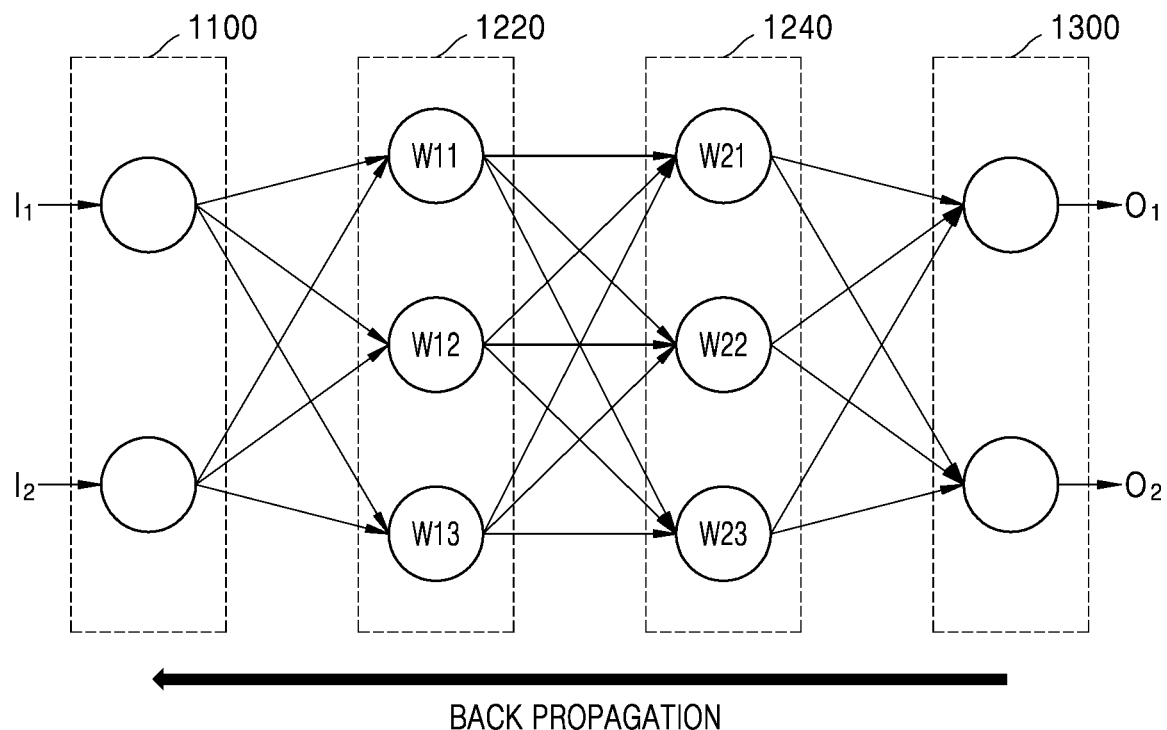
FIG. 3 illustrates a neural network, according to an example embodiment.

FIG. 3 illustrates a neural network 1000, according to an example embodiment. The neural network 1000 may include an input layer 1100, hidden layers 1220 and 1240, and an output layer 1300. The neural network 1000 may perform an operation based on input data I1 and I2 and generate output data O1 and O2 based on an operation result. Although the neural network 1000 includes two hidden layers in FIG. 3, this is just an example and embodiments are not limited thereto. For example, the neural network 1000 may include one or more hidden layers.

Each of the layers, i.e., the input layer 1100, the hidden layers 1220 and 1240, and the output layer 1300, included in the neural network 1000 may include multiple neurons. A neuron may refer to an artificial node which is known as a processing element (PE), a processing unit, or a similar term. For example, the input layer 1100 may include two neurons, each of the hidden layers 1220 and 1240 may include three neurons, and the output layer 1300 may include two neurons, as shown in FIG. 3. However, the configuration in FIG. 3 is only an example, and each of the input layer 1100, the hidden layers 1220 and 1240, and the output layer 1300 in the neural network 1000 may include various numbers of neurons.

Neurons included in each of the input layer 1100, the hidden layers 1220 and 1240, and the output layer 1300 in the neural network 1000 may be connected to neurons in a different layer and may exchange data with the neurons in the different layer. A neuron may receive data from other neurons, perform an operation on the data, and output an operation result to other neurons.

Input to and output from each neuron may be referred to as an input activation and an output activation, respectively. Activation may be a parameter which simultaneously corresponds to an output from a neuron in a layer and an input to one or more neurons included in a successive layer. In other words, an output activation from a neuron in one layer may be an input activation to one or more neurons in a successive layer. Each neuron may determine (e.g., calculate, generate etc.) an output activation based on input activations received from neurons included in a preceding layer, a weight among the weights shown in FIG. 3 as W11, W12, W13, W21, W22, and W23, and a bias. In an embodiment, each of the weights W11, W12, W13, W21, W22, and W23 may itself be a weight matrix that includes multiple weight values as components. A weight and a bias are parameters used to calculate an output activation in a neuron. A weight may be a value assigned to a connection relationship between neurons, and a bias may indicate a weight related to an individual neuron.

As described above, each of the input layer 1100, the hidden layers 1220 and 1240, and the output layer 1300 may perform at least one operation such that neurons may determine (e.g., calculate, generate etc.) an output activation. As described above, an output activation may be considered an output from a one of the input layer 1100, the hidden layers 1220 and 1240, and the output layer 1300 that may also be an input to the successive layer (if applicable) among the hidden layers 1220 and 1240 and the output layer 1300.

General learning of and/or by the neural network 1000 may include multiple learning iterations and initial weights. The initial weights W11, W12, W13, W21, W22, and W23, may have random values. The neural network 1000 may change the weights W11, W12, W13, W21, W22, and W23 through back propagation using the output data O1 and O2 at each learning iteration. A learning iteration may be referred to as an epoch. The neural network 1000 that has been trained by performing multiple learning iterations may include the trained weights W11, W12, W13, W21, W22, and W23. For convenience of description, generating the trained weights W11, W12, W13, W21, W22, and W23 may be described herein in terms of training the weights W11, W12, W13, W21, W22, and W23 through the learning operation of the neural network 1000.

Transfer learning of and/or by the neural network 1000 may train the weights W11, W12, W13, W21, W22, and W23 through a similar process. However, in the case of transfer learning, the weights W11, W12, W13, W21, W22, and W23 may have initial values corresponding to other trained weights, instead of random initial values as in the general learning.

Figure 4:
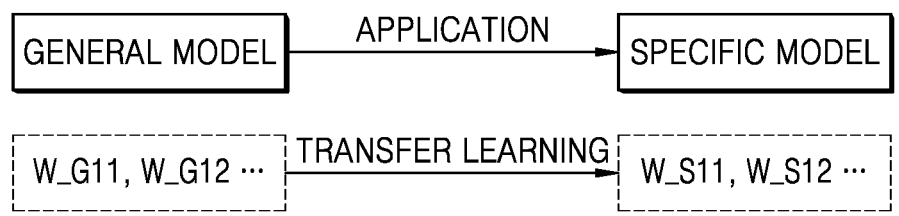
FIG. 4 illustrates a transfer learning method, according to an example embodiment.

FIG. 4 illustrates a transfer learning method, according to an example embodiment. Transfer learning may refer to learning of and/or by a neural network applied to a second model using a neural network applied to a first model. For example, transfer learning may include learning of and/or by a neural network applied to a specific model using a neural network algorithm or weights that were each applied to an existing trained general model.

In other words, a process of obtaining weights W_S11 and W_S12, which are applied to a specific model, using trained weights W_G11 and W_G12 that have been trained in a general model may be referred to as transfer learning. Transfer learning may indicate a process of obtaining the weights W_S11 and W_S12, which are applied to a specific model, by performing multiple learning iterations on multiple layers using the trained weights W_G11 and W_G12 as initial weights. In other words, the trained weights W_G11 and W_G12 from the general model may be the starting weights used to train the specific model.

To promote understanding, an example general model may be a model trained to recognize images of dogs. When the general model trained to recognize images of dogs includes weights, a model recognizing a breed of a specific dog may be trained using the weights from the general model. For example, to train a model recognizing a Chihuahua breed, a neural network system may perform transfer learning using weights corresponding to the general model trained to recognize images of dogs. The weights from the general model may be initial values in the training of the specific model. Since the general model is an existing trained model, weights from the general model applied to one or more of the layers of the specific model as initial values may already be saturated or may be close to being saturated.

Figure 5:
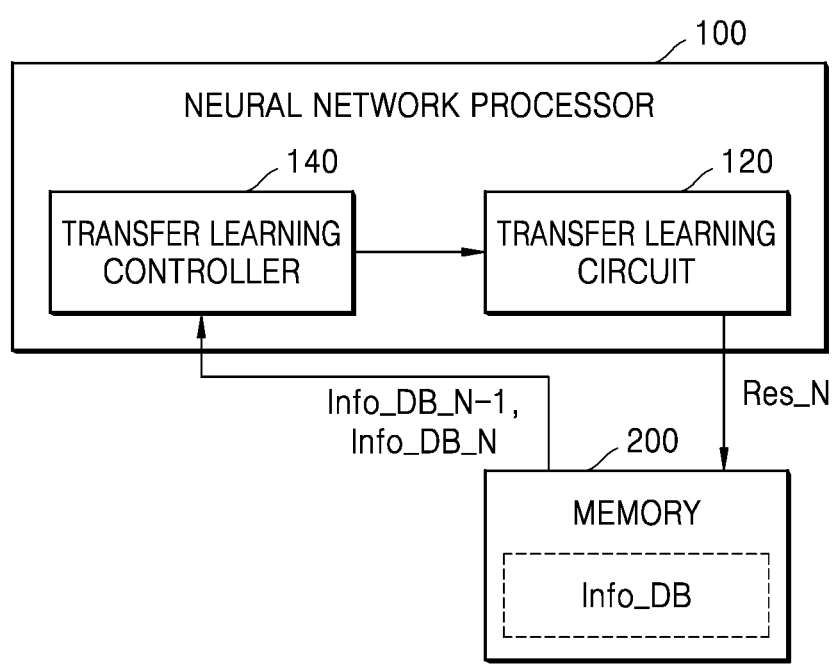
FIG. 5 illustrates a neural network system, according to an example embodiment.

FIG. 5 illustrates a neural network system 30, according to an example embodiment. The neural network system 30 of FIG. 5 may correspond to the electronic system 10 of FIG. 1 and the electronic system 20 of FIG. 2. The neural network system 30 may include the neural network processor 100 and the memory 200. The neural network processor 100 may be a detailed example of the neural network processor 100 in FIG. 1 and/or the NPU 1001 in FIG. 2. The memory 200 in FIG. 5 may correspond to the RAM 2001 in FIG. 2 and/or the memory 400 in FIG. 400 according to an embodiment but is not limited thereto. For example, the memory 200 in FIG. 5 may include the RAM 2001 and the memory 400 in FIG. 2.

The neural network processor 100 in FIG. 5 may include a transfer learning circuit 120 and a transfer learning controller 140.

The transfer learning circuit 120 may perform transfer learning of and/or by the neural network processor 100. For this operation, the transfer learning circuit 120 may perform multiple learning iterations in multiple layers. The transfer learning circuit 120 may update weights each time a learning iteration is performed in each of the multiple layers. For example, the transfer learning circuit 120 may update weights based on output data resulting from an N-th learning iteration (where N is a natural number). The transfer learning circuit 120 may output updated weights as an N-th learning result Res_N. The transfer learning circuit 120 may provide the N-th learning result Res_N to the memory 200 so that the memory 200 stores the N-th learning result Res_N.

The transfer learning of the transfer learning circuit 120 may be implemented in various forms and may be implemented by hardware and/or software according to various embodiments. For example, when the transfer learning is implemented by hardware, the transfer learning circuit 120 may include circuits that perform transfer learning. When the transfer learning is implemented by software, transfer learning may be performed by executing a program (or instructions) stored in the memory 200 using the neural network processor 100 or at least one other processor. However, the transfer learning of the transfer learning circuit 120 is not limited these embodiments and may be implemented by a combination of software and hardware, e.g., firmware.

The transfer learning controller 140 may control the transfer learning of and/or by the transfer learning circuit 120. In an embodiment, the transfer learning controller 140 may determine a layer in which learning will be interrupted in a subsequent learning iteration based on a result of comparing the distribution of weight values resulting from a current learning iteration with the distribution of weight values resulting from a previous learning iteration. The transfer learning controller 140 may control the transfer learning circuit 120 to perform learning only in layers excluding the layer for which interruption of the learning is determined in the subsequent learning iteration. For example, after the N-th learning iteration ends, the transfer learning controller 140 may receive distribution information Info_DB_N−1 about the distribution of weight values resulting from an (N−1)-th learning iteration and receive distribution information Info_DB_N about the distribution of weight values resulting from the N-th learning iteration from the memory 200. The transfer learning controller 140 may determine a layer in which learning is interrupted based on the distribution information Info_DB_N−1 and the distribution information Info_DB_N. A method of determining interruption of the learning will be described in detail with reference to the drawings below.

The memory 200 may store transfer learning results that are provided from the transfer learning circuit 120. For example, after the N-th learning iteration ends, the memory 200 may store the N-th learning result Res_N provided from the transfer learning circuit 120. In an embodiment, the memory 200 may include DRAM.

The memory 200 may store distribution information Info_DB indicating information about the distribution of weight values. In an embodiment, the memory 200 may obtain the distribution information Info_DB using a logic circuit in the memory 200 when weights are stored in the memory 200 and may store the distribution information Info_DB therein. In other words, the memory 200 may be implemented as processing-in-memory (PIM) and may directly obtain the distribution information Info_DB from weights. The memory 200 may provide the distribution information Info_DB to the neural network processor 100.

According to an example embodiment, the neural network system 30 including the neural network processor 100 and the memory 200 excludes subsequent learning iterations in one or more layers in which weight values are saturated, based on a result of comparing the distribution of previous weight values with the distribution of current weight values. As a result, the neural network system 30 reduces the total transfer learning time and eventually increases a transfer learning speed.

Figure 6:
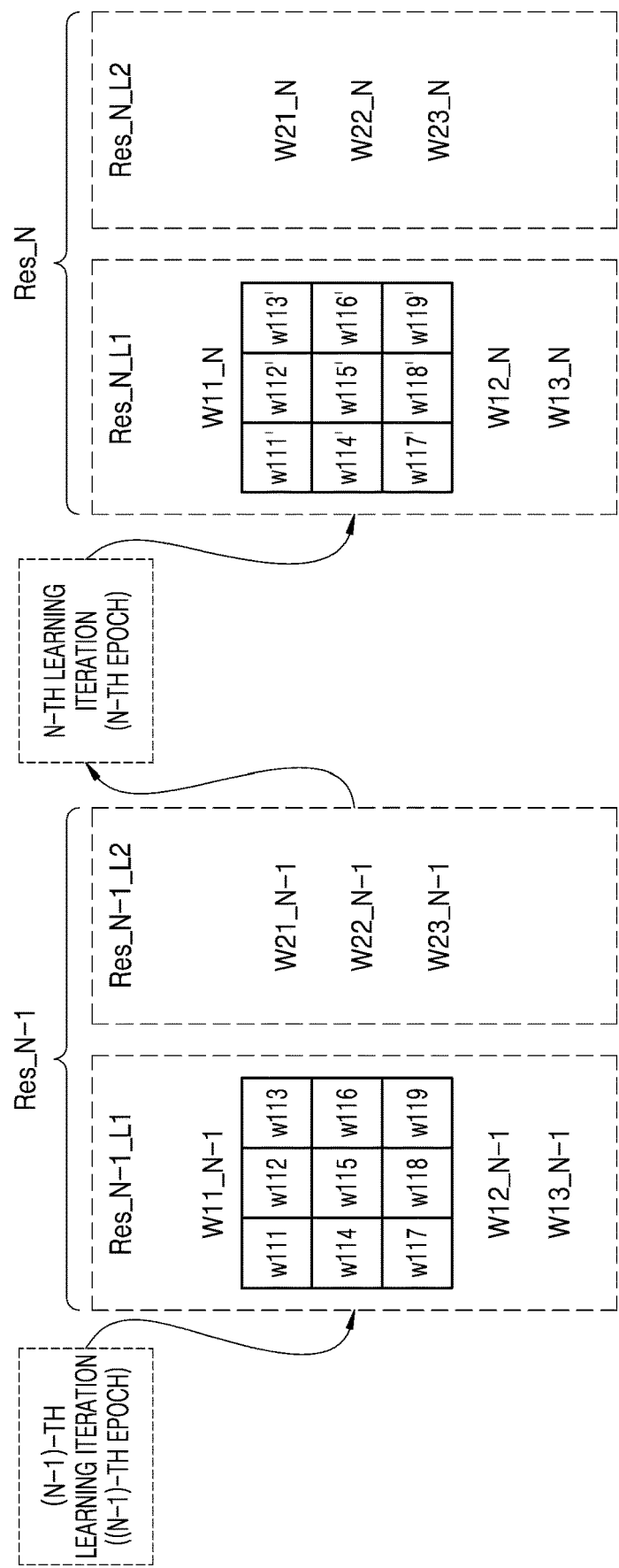
FIG. 6 shows result values obtained through a transfer learning process, according to an example embodiment.

FIG. 6 shows result values obtained through a transfer learning process, according to an example embodiment. In particular, FIG. 6 shows an (N−1)-th learning result Res_N−1 obtained after the (N−1)-th learning iteration and the N-th learning result Res_N obtained after the N-th learning iteration (where N is 2 or a natural number greater than 2). For convenience of description, it is assumed that the neural network 1000 of FIG. 3 is used in FIG. 6. However, this is just an example, and embodiments are not limited to the numbers of layers and neurons in FIG. 3. Descriptions will be made with reference to FIGS. 5 and 6.

The (N−1)-th learning result Res_N−1 may include an (N−1)-th learning result in a first hidden layer, i.e., a first hidden layer's (N−1)-th learning result Res_N−1_L1, and an (N−1)-th learning result in a second hidden layer, i.e., a second hidden layer's (N−1)-th learning result Res_N−1_L2. The first hidden layer's (N−1)-th learning result Res_N−1_L1 may include weights W11_N−1, W12_N−1, and W13_N−1. The second hidden layer's (N−1)-th learning result Res_N−1_L2 may include weights W21_N−1, W22_N−1, and W23_N−1. When the weight W11_N−1 is described as a representative of the weights W11_N−1, W12_N−1, W13_N−1, W21_N−1, W22_N−1, and W23_N−1, the weight W11_N−1 may include multiple weight values w111, w112, w113, w114, w115, w116, w117, w118, and w119. The number of weight values here is an example, and the number of weight values of a weight may be fewer than or more than nine. Here, the weight values w111, w112, w113, w114, w115, w116, w117, w118, and w119 may be referred to as weight components w111, w112, w113, w114, w115, w116, w117, w118, and w119.

Similarly, the N-th learning result Res_N may include an N-th learning result in the first hidden layer, i.e., the first hidden layer's N-th learning result Res_N_L1, and an N-th learning result in the second hidden layer, i.e., the second hidden layer's N-th learning result Res_N_L2. The first hidden layer's N-th learning result Res_N_L1 may include weights W11_N, W12_N, and W13_N. The second hidden layer's N-th learning result Res_N_L2 may include weights W21_N, W22_N, and W23_N. When the weight W11_N is described as a representative of the weights W11_N, W12_N, W13_N, W21_N, W22_N, and W23_N, the weight W11_N may include multiple weight values w111', w112', w113', w114', w115', w116', w117', w118', and w119'. The number of weight values here is again an example, and the number of weight values of a weight may be fewer than or more than nine. Here, the weight values w111', w112', w113', w114', w115', w116', w117', w118', and w119' may be referred to as weight components w111', w112', w113', w114', w115', w116', w117', w118', and w119'.

As described above, weights included in a learning result and weight values included in each weight may be updated as a learning process progresses.

However, in transfer learning that uses weight values of a trained neural network, weight values included in a certain layer may be saturated from the initial iteration or after only a small number of learning iterations. It may be inefficient to perform learning in a layer in which the weight values have been saturated. According to an example embodiment, a neural network system may reduce the time taken for transfer learning by excluding (e.g., skipping, bypassing etc.) learning in a layer in which weight values have been saturated, as described below.

Figure 7:
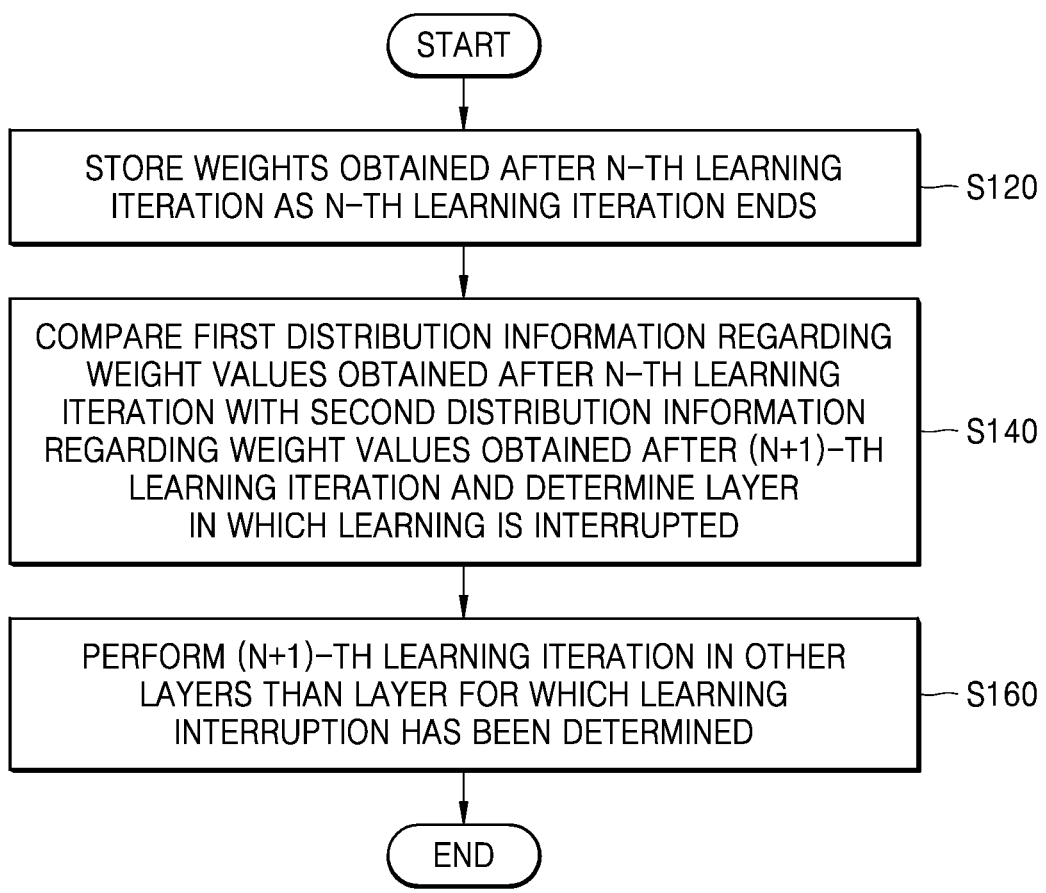
FIG. 7 illustrates a flowchart of a learning method of a neural network system, according to an example embodiment.

FIG. 7 illustrates a flowchart of a learning method of a neural network system, according to an example embodiment. In particular, FIG. 7 may illustrate a flowchart of a transfer learning method of the neural network system 30 of FIG. 5. Descriptions will be made with reference to FIGS. 5 and 7.

As the N-th learning iteration ends, the neural network system 30 may store weights obtained after the N-th learning iteration in operation S120. For example, the neural network processor 100 may perform transfer learning including multiple learning iterations in multiple layers. After performing the N-th learning iteration among the multiple learning iterations (where N is a natural number), the neural network processor 100 may provide weights resulting from the N-th learning iteration to the memory 200, and the memory 200 may store the weights resulting from the N-th learning iteration therein.

The neural network system 30 may compare first distribution information regarding weight values obtained after the N-th learning iteration with second distribution information regarding weight values obtained after the (N−1)-th learning iteration. The neural network system 30 may determine a layer in which learning is interrupted, in operation S140. In an embodiment, the memory 200 may provide the first distribution information regarding first weight values resulting from the N-th learning iteration and the second distribution information regarding second weight values resulting from the (N−1)-th learning iteration to the neural network processor 100, and the neural network processor 100 may determine the layer in which learning is interrupted based on the first distribution information and the second distribution information. A method of determining a layer in which learning is interrupted will be described in detail with reference to FIGS. 10 and 11. In an embodiment, the memory 200 may provide the first distribution information regarding first weight values resulting from the N-th learning iteration and the second distribution information regarding second weight values resulting from the (N−1)-th learning iteration to a separate processor. The separate processor may determine the layer in which learning is interrupted based on the first distribution information and the second distribution information. The separate processor may also provide information about the layer for which interruption of the learning has been determined to the neural network processor 100. Such an embodiment will be described with reference to FIG. 14.

In an embodiment, when N is "1", that is, when the first learning iteration ends, the neural network system 30 may compare the first distribution information regarding weight values obtained after the first learning iteration with distribution information regarding initial weight values instead of weight values obtained after the (N−1)-th learning iteration in operation S140. In other words, since there is no such thing as a zeroth learning iteration, there are not weight values obtained after a zeroth learning iteration, and the initial weight values may be used instead of non-existent weight values obtained after the zeroth learning iteration in operation S140.

The neural network system 30 may perform an (N+1)-th learning iteration in layers other than the layer in which interruption of the learning has been determined, in operation S160.

When a transfer learning method according to an example embodiment is used, any further learning is excluded (e.g., skipped, bypassed etc.) in a layer in which weight values have been saturated. Therefore, the time taken for transfer learning may be reduced and an overall transfer learning speed may be increased.

Figure 8A:
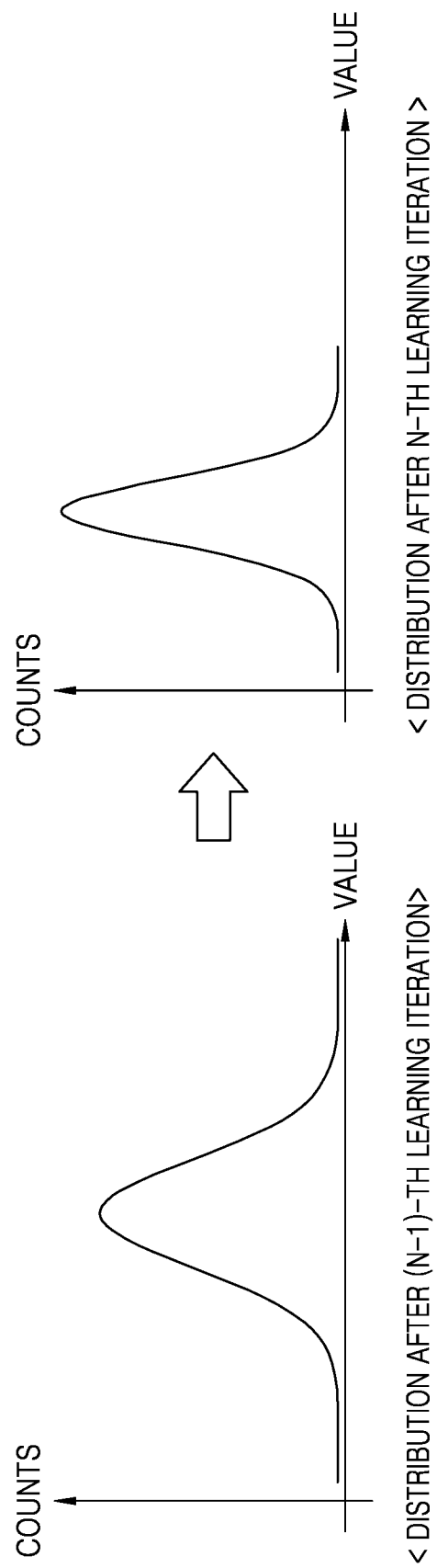
FIG. 8A illustrates a change in the distribution of weight values, according to an example embodiment.
Figure 8B:
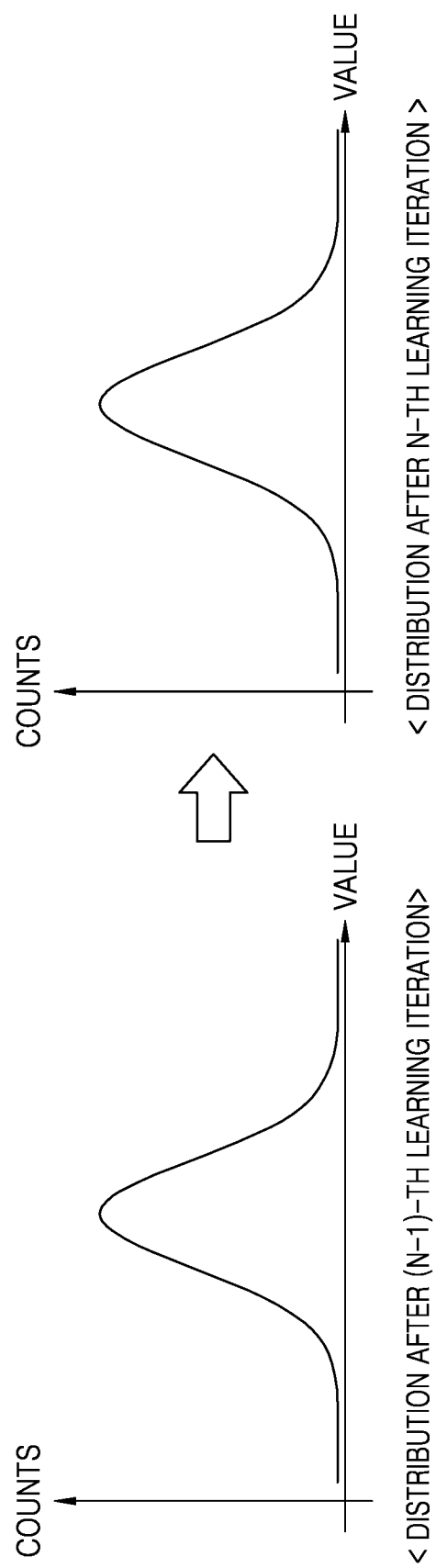
FIG. 8B also illustrates a change in the distribution of weight values, according to an example embodiment

FIGS. 8A and 8B illustrate a change in the distribution of weight values, according to an example embodiment. FIGS. 8A and 8B may show the distribution of weight values after the (N−1)-th learning iteration and the distribution of weight values after the N-th learning iteration. In particular, FIGS. 8A and 8B may show distributions in a certain layer. Descriptions will be made with reference to FIGS. 5 and 7 and FIGS. 8A and 8B.

Referring to FIG. 8A, in the case of a certain hidden layer, the distribution of weight values may be changed after the N-th learning iteration. When the distribution of weight values is significantly changed after learning, as shown in FIG. 8A, the neural network system 30 may determine that there is no interruption of the learning for the hidden layer in operation S140.

Referring to FIG. 8B, in the case of another certain hidden layer, the distribution of weight values may not be substantially changed after the N-th learning iteration. When the distribution of weight values is insignificantly changed or not changed at all after learning, as shown in FIG. 8B, the neural network system 30 may determine that there is interruption of the learning for the hidden layer in operation S140.

Figure 9A:
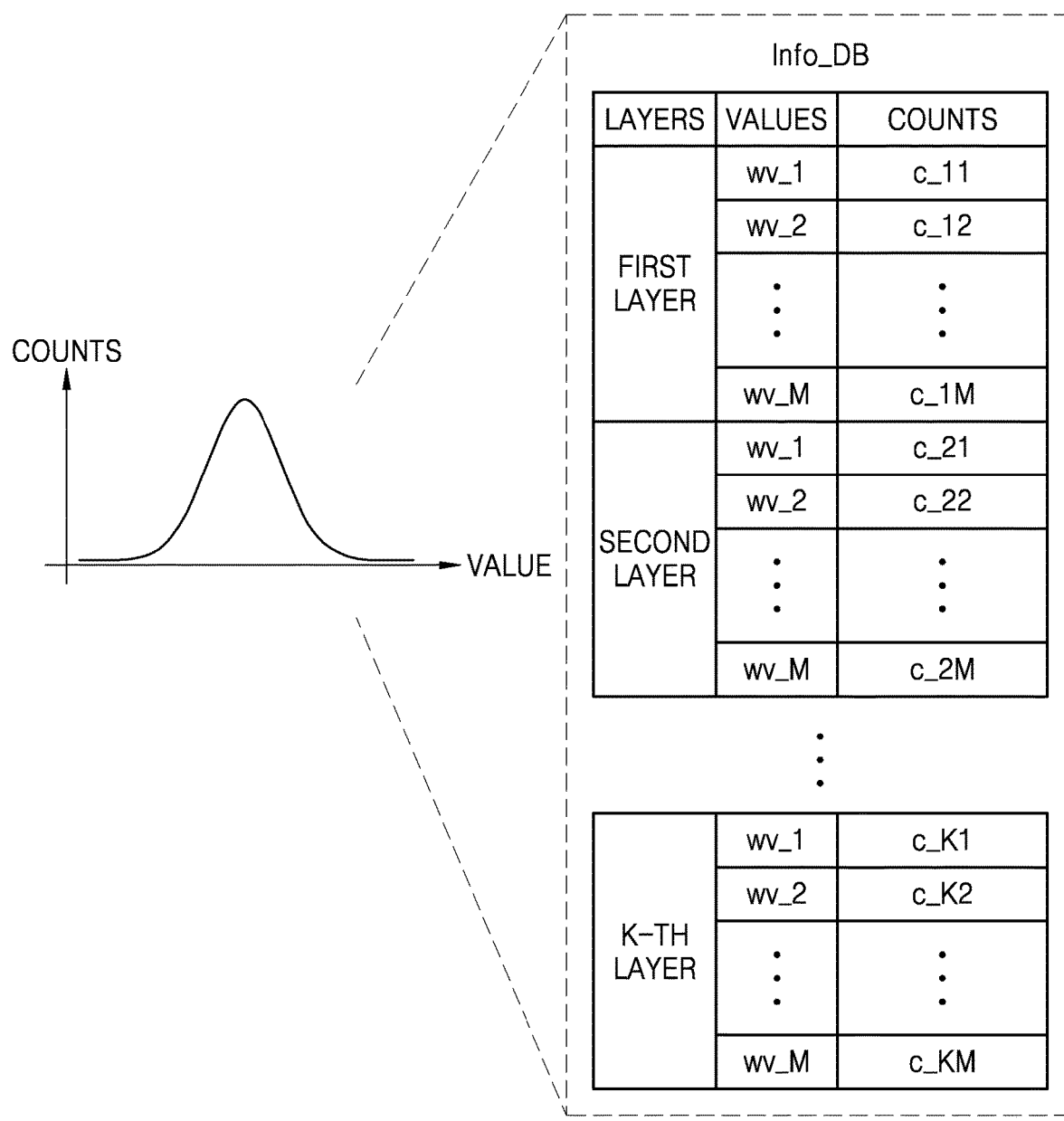
FIG. 9A shows distribution information, according to an example embodiment.
Figure 9B:
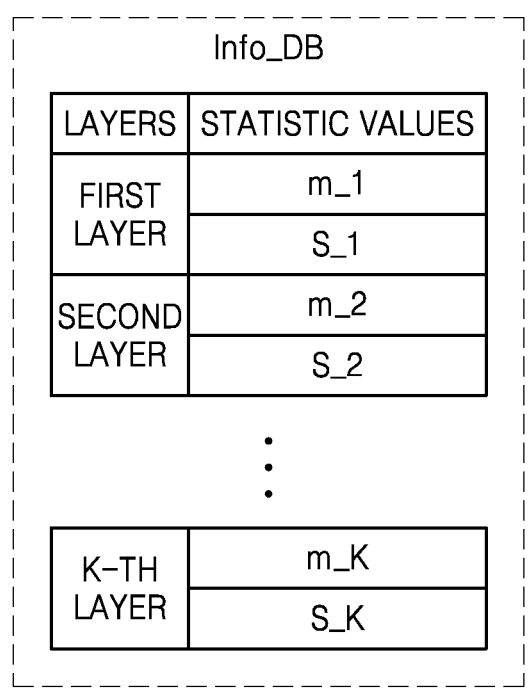
FIG. 9B also shows distribution information, according to an example embodiment.

FIGS. 9A and 9B show the distribution information Info_DB, according to an example embodiment. FIGS. 9A and 9B may show the distribution information Info_DB regarding weight values obtained after the N-th learning iteration. FIGS. 9A and 9B show the case where a neural network includes K hidden layers (where K is a natural number). Descriptions will be made with reference to FIGS. 5, 9A, and 9B.

Referring to FIG. 9A, the distribution information Info_DB may include histogram information regarding weight values corresponding to multiple layers.

Histogram information corresponding to each layer may include information about a weight value count corresponding to each weight value, as shown in the left of FIG. 9A. In detail, for example, histogram information of a first layer may include counts $c\_11, c\_12, \ldots,$ and $c\_1M$ respectively corresponding to weight values $wv\_1, wv\_2, \ldots, wv\_M$, where M is a natural number. In other words, the first count $c\_11$ may be the number (the total number of, the sum of the number of, the count of the number of, the count of the number of etc.) of the first weight values $wv\_1$ in the first layer, and the second count $c\_12$ may be the number (the total number of, the sum of the number of, the count of the number of, the count of the number of etc.) of the second weight values $wv\_2$ in the first layer.

Similarly, for example, histogram information of a second layer may include counts $c\_21, c\_22, \ldots,$ and $c\_2M$ respectively corresponding to the weight values $wv\_1, wv\_2, \ldots,$ and $wv\_M$, where M is a natural number. In other words, the first count $c\_21$ may be the number (the total number of, the sum of the number of, the count of the number of, the count of the number of etc.) of the first weight values $wv\_1$ in the second layer, and the second count $c\_22$ may be the number (the total number of, the sum of the number of, the count of the number of, the count of the number of etc.) of the second weight values $wv\_2$ in the second layer.

Similarly, for example, histogram information of a K-th layer may include counts $c\_K1, c\_K2, \ldots,$ and $c\_KM$ respectively corresponding to the weight values $wv\_1, wv\_2, \ldots,$ and $wv\_M$, where M is a natural number. In other words, the first count $c\_K1$ may be the number (the total number of, the sum of the number of, the count of the number of, the count of the number of etc.) of the first weight values $wv\_1$ in the K-th layer, and the second count $c\_K2$ may be the number (the total number of, the sum of the number of, the count of the number of, the count of the number of etc.) of the second weight values $wv\_2$ in the K-th layer. The neural network processor 100 in FIG. 5 may determine a layer in which a subsequent learning iteration is interrupted based on such histogram information. This will be described in detail with reference to FIG. 10.

Referring to FIG. 9B, the distribution information Info_DB may include statistic information regarding weight values corresponding to multiple layers. The statistic information may indicate a value obtained through statistical processing using the weight values. In an embodiment, the statistic information may include at least one selected from various kinds of statistic information, such as the mean, variance, standard deviation, maximum, and minimum of weight values in each layer. FIG. 9B illustrates the case where the statistic information includes the mean and the standard deviation.

Referring to FIG. 9B, for example, the mean of weight values corresponding to the first layer may have a first mean value $m\_1$, and the standard deviation corresponding to the first layer may have a first standard deviation value $S\_1$. Similarly, the mean of weight values corresponding to the second layer may have a second mean value $m\_2$, and the standard deviation corresponding to the second layer may have a second standard deviation value $S\_2$. Similarly, the mean of weight values corresponding to the K-th layer may have a K-th mean value $m\_K$, and the standard deviation corresponding to the K-th layer may have a K-th standard deviation value $S\_K$. The neural network processor 100 in FIG. 5 may determine a layer in which a subsequent learning iteration is interrupted based on such statistic information. This will be described in detail with reference to FIG. 11.

FIG. 10 illustrates another flowchart of a learning method of a neural network system, according to an example embodiment. In particular, FIG. 10 may be a flowchart of a transfer learning method corresponding to the case where distribution information includes histogram information such as that shown in FIG. 9A. In addition, FIG. 10 may illustrate a detailed flowchart of operation S140 in FIG. 7. Descriptions will be made with reference to FIGS. 5 and 10.

The neural network system 30 may subtract second histogram information included in second distribution information from first histogram information included in first distribution information in operation S142. For example, the neural network system 30 may subtract a first count of the first histogram information from a second count of the second histogram information, wherein the first count and the second count correspond to the same weight values among all weight values in each layer. The neural network system 30 may obtain subtracted histogram information for each layer by performing such subtraction on all of the weight values.

In operation S144, the neural network system 30 may obtain a difference indicator value by adding up absolute values of values included in the subtracted histogram information resulting from the subtraction from S142. When the difference indicator value is high, it means that a difference between weight values resulting from the (N−1)-th learning iteration and weight values resulting from the N-th learning iteration is great. When the difference indicator value is low, it means that a difference between weight values resulting from the (N−1)-th learning iteration and weight values resulting from the N-th learning iteration is small. The smaller difference may be taken to mean that learning is interrupted in the layer, since few or no values or changing as indicated by the smaller difference. The greater difference may be taken to mean that learning is occurring since a high number of values are changing.

The neural network system 30 may determine interruption of the learning for a layer, which has a difference indicator value that is equal to or less than a threshold value, in operation S146. Here, the threshold value may be predetermined and may be an invariable value or a variable value.

Figure 11:
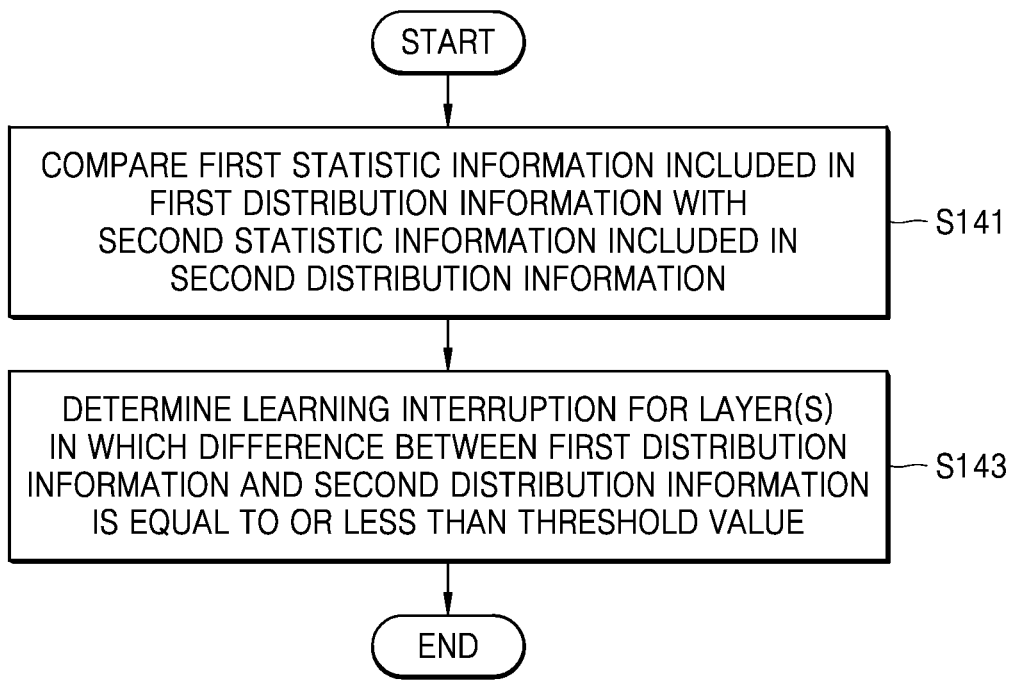
FIG. 11 illustrates another flowchart of a learning method of a neural network system, according to an example embodiment.

FIG. 11 illustrates another flowchart of a learning method of a neural network system, according to an example embodiment. In particular, FIG. 11 may be a flowchart of a transfer learning method corresponding to the case where distribution information includes histogram information such as that shown in FIG. 9B. In addition, FIG. 11 may illustrate a detailed flowchart of operation S140 in FIG. 7. Descriptions will be made with reference to FIGS. 5 and 11.

The neural network system 30 may compare first statistic information included in first distribution information with second statistic information included in second distribution information for (with respect to) each layer in operation S141. For example, the first statistic information and the second statistic information may include at least one selected from a mean value, a variance value, a standard deviation value, a maximum value, and a minimum value, as described above with reference to FIG. 9B.

The neural network system 30 may determine interruption of the learning for a layer in which a difference between the first statistic information and the second statistic information is equal to or less than a threshold value, in operation S143. For example, the neural network system 30 may determine interruption of the learning for a layer in which a difference between a mean value included in the first statistic information and a mean value included in the second statistic information is equal to or less than the threshold value. In another example, the neural network system 30 may determine interruption of the learning for a layer in which a difference between a standard deviation value included in the first statistic information and a standard deviation value included in the second statistic information is equal to or less than the threshold value. Here, the threshold value may be predetermined and may be an invariable value or a variable value. However, embodiments are not limited thereto. For example, the neural network system 30 may determine interruption of the learning for a layer in which a mean value difference is equal to or less than a first threshold value and a standard deviation value difference is equal to or less than a second threshold value.

Figure 12:
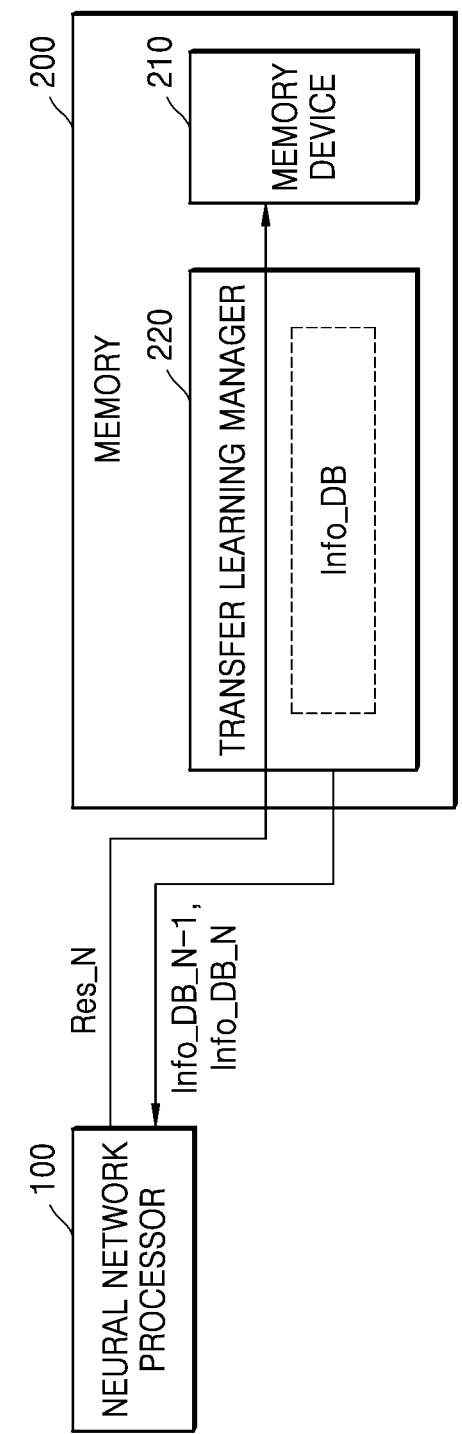
FIG. 12 illustrates another neural network system, according to an example embodiment.

FIG. 12 illustrates another neural network system 40, according to an example embodiment. Redundant descriptions of the neural network system 10, the neural network system 20 and the neural network system 30 that have been made with reference to FIGS. 1 through 11 will be omitted.

The memory 200 may include a memory device 210 and a transfer learning manager 220. The memory device 210 may refer to a physical addressable memory in which data is stored.

The neural network processor 100 may provide the N-th learning result Res_N to the memory 200 after the N-th learning iteration ends. The memory 200 may store the N-th learning result Res_N in the memory device 210.

At this time, the transfer learning manager 220 may generate the distribution information Info_DB of weight values included in the N-th learning result Res_N using the weight values. The distribution information Info_DB may include histogram information, as shown in FIG. 9A, or statistic information, as shown in FIG. 9B. The transfer learning manager 220 may store the distribution information Info_DB therein. After the N-th learning iteration ends, the transfer learning manager 220 may provide the distribution information Info_DB_N−1 of weight values resulting from the (N−1)-th learning iteration and the distribution information Info_DB_N of weight values resulting from the N-th learning iteration to the neural network processor 100. The transfer learning manager 220 may be referred to as a transfer learning management circuit.

Figure 15:
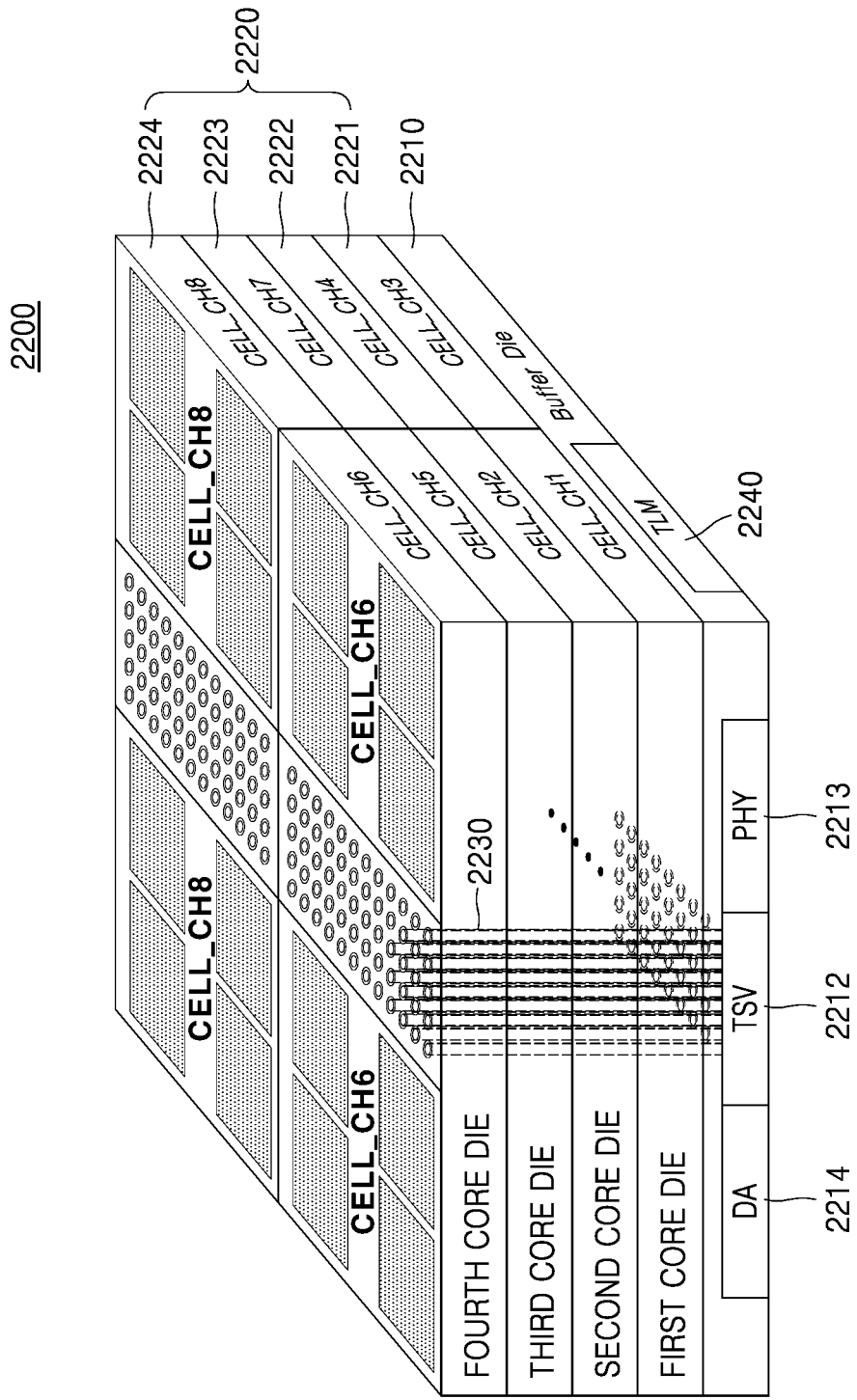
FIG. 15 illustrates a memory device, according to an example embodiment.

The transfer learning manager 220 may be implemented in the memory 200, for example, in a logic circuit area of the memory 200. Alternatively, the transfer learning manager 220 may be formed in a buffer die area, as shown in FIG. 15 described below. As described above, a configuration for performing a processing operation may be included in the memory 200. For example, the memory 200 may be implemented as processing in memory (PIM) with a processor integrated into the memory 200 such as on a single chip.

Figure 13:
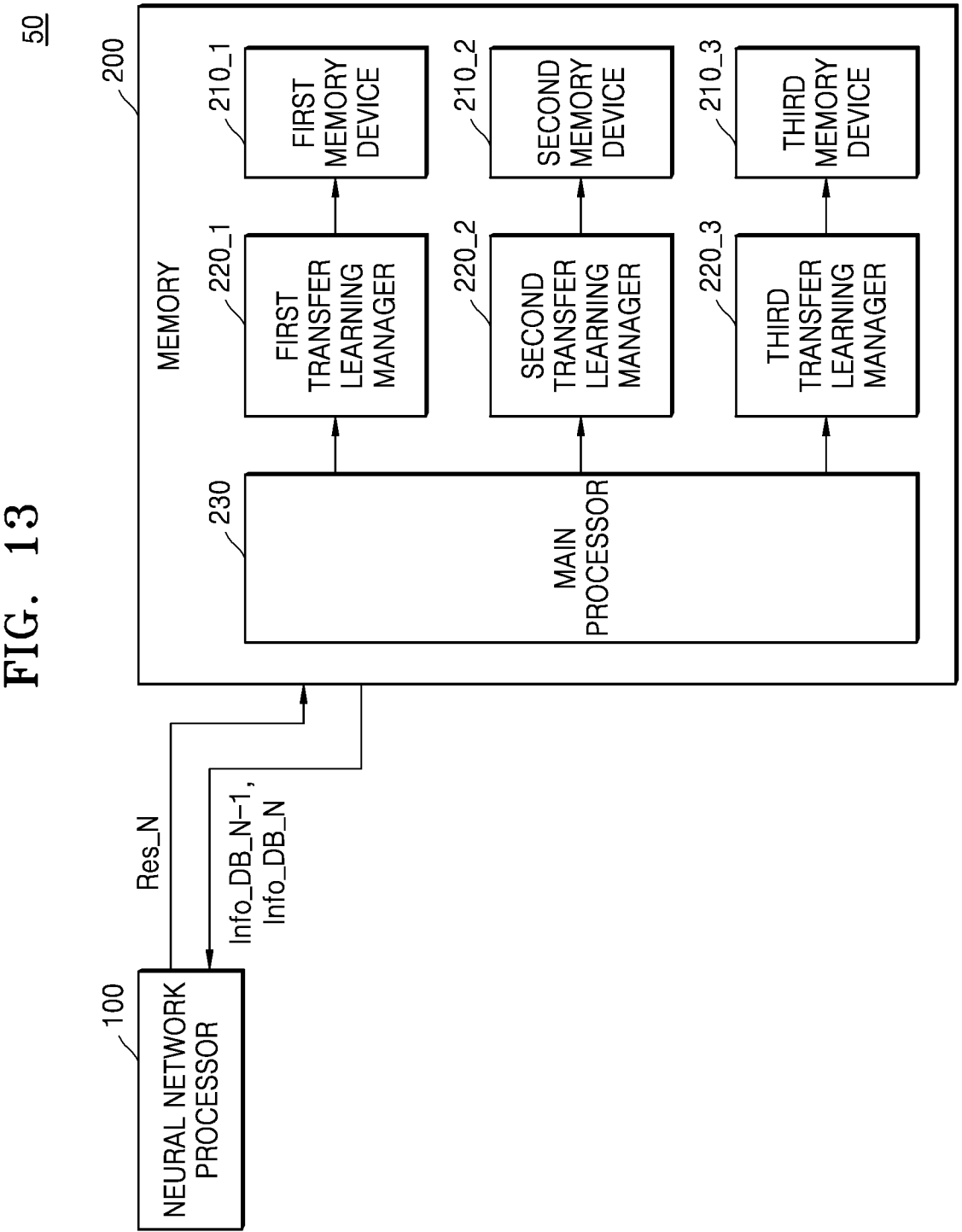
FIG. 13 illustrates another neural network system, according to an example embodiment.

FIG. 13 illustrates another neural network system 50, according to an example embodiment. Redundant descriptions of the neural network system 10, the neural network system 20, the neural network system 30 and the neural network system 40 that have been made with reference to FIGS. 1 through 12 will be omitted. In particular, descriptions will be focused on the differences between the neural network system 50 of FIG. 13 and the neural network system 40 of FIG. 12.

The memory 200 may include a first memory device 210_1, a first transfer learning manager 220_1 corresponding to the first memory device 210_1, a second memory device 210_2, a second transfer learning manager 220_2 corresponding to the second memory device 210_2, a third memory device 210_3, a third transfer learning manager 220_3 corresponding to the third memory device 210_3, and a main processor 230. The number of memory devices in FIG. 13 is just an example for convenience of description, and embodiments are not limited thereto.

The main processor 230 may control the various operations of the memory 200.

For convenience of description, it is assumed that the neural network 1000 of FIG. 3 is used. It is also assumed that weights in a first hidden layer are stored in the memory 200. In an embodiment, the memory 200 may store the weight W11 in the first memory device 210_1, the weight W12 in the second memory device 210_2, and the weight W13 in the third memory device 210_3. In the process of storing each weight, the memory 200 may also obtain distribution information of weight values included in the weight from a transfer learning manager corresponding to each memory device.

In an embodiment, the weight W11 and the weight W12 may be grouped and stored in the first memory device 210_1, and the weight W13 may be stored in the second memory device 210_2.

Addressing for each weight may be determined by an external processor (e.g., a CPU), determined under the control of the main processor 230, or determined based on a group ID stored in each of the first transfer learning manager 220_1 through third transfer learning manager 220_3. That is, the weights are stored at memory addresses, and the memory addresses of the weights may be used to retrieve and update the weights in the iterative transfer learning by the neural network 1000. Accordingly, the memory addresses of the weights may be determined and managed by an external processor, under the control of the main processor 230, or determined based on a group I stored in each of the first transfer learning manager 220_1 through third transfer learning manager 220_3.

Figure 14:
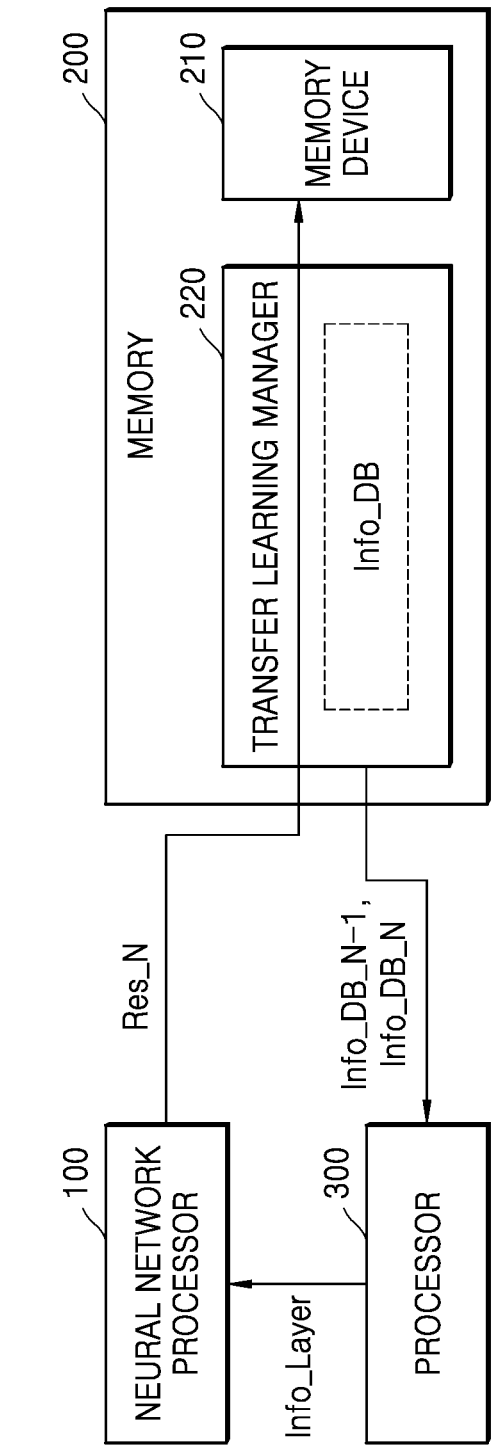
FIG. 14 illustrates another neural network system, according to an example embodiment.

FIG. 14 illustrates another neural network system 60, according to an example embodiment. Redundant descriptions of the neural network system 10, the neural network system 20, the neural network system 30, the neural network system 40 and the neural network system 50 that have been made with reference to FIGS. 1 through 13 will be omitted. In particular, descriptions will be focused on the differences between the neural network system 60 of FIG. 14 and the neural network system 40 of FIG. 12.

Unlike FIG. 12, the transfer learning manager 220 may provide the distribution information Info_DB_N−1 and the distribution information Info_DB_N to a processor 300 instead of the neural network processor 100 after the N-th learning iteration ends. Accordingly, the processor 300 may perform an operation of determining a layer in which learning is interrupted, as an operation corresponding to operation S140 in FIG. 7. The processor 300 may provide layer information Info_Layer regarding a layer, for which interruption of the learning has been determined, to the neural network processor 100. The neural network processor 100 may perform the (N+1)-th learning iteration on layers other than the layer for which interruption of the learning has been determined, based on the layer information Info_Layer provided from the processor 300.

FIG. 15 illustrates memory 2200, according to an example embodiment. The memory 2200 may correspond to the memory 200 in FIGS. 12 through 14. FIG. 15 illustrates the memory 2200 implemented as high bandwidth memory (HBM), which has an increased bandwidth by including multiple channels having an independent interface.

The memory 2200 may include multiple layers. For example, the memory 2200 may include a buffer die 2210 and a structure in which at least one core die 2220 is stacked on the buffer die 2210. For example, a first core die 2221 may include a first channel CH1 and a third channel CH3, a second core die 2222 may include a second channel CH2 and a fourth channel CH4, a third core die 2223 may include a fifth channel CH5 and a seventh channel CH7, and a fourth core die 2224 may include a sixth channel CH6 and an eighth channel CH8.

The buffer die 2210 may communicate with a memory controller, receive commands, addresses, and data from the memory controller, and provide the commands, the addresses, and the data to the at least one core die 2220. The buffer die 2210 may communicate with the memory controller through a conductive member, e.g., a bump, formed on an outer surface thereof. The buffer die 2210 may buffer a command, an address, and data, and accordingly, the memory controller may interface with the at least one core die 2220 by driving only the load of the buffer die 2210.

The memory 2200 may also include multiple TSVs 2230 (through-silicon vias) penetrating through the layers. The TSVs 2230 may be provided corresponding to multiple of the first channel CH1 through eighth channel CH8. When each of the first channel CH1 through eighth channel CH8 has a 128-bit bandwidth, the TSVs 2230 may include composition for input and output of 1024-bit data.

The buffer die 2210 may include a TSV area 2212, a PHY area 2213 (physical area), and a DA area 2214 (a direct access area). The TSV area 2212 is an area in which TSVs 2230 for communication with the at least one core die 2220 are formed. The PHY area 2213 may include multiple input/output circuits for communication with an external memory controller. Various signals from the memory controller may be provided to the TSV area 2212 through the PHY area 2213 and to the at least one core die 2220 through the TSVs 2230.

According to an example embodiment, a transfer learning manager 2240 (TLM) such as that shown in FIGS. 12 through 14 may be implemented in the buffer die 2210. The transfer learning manager 2240 may correspond to the transfer learning manager 220 described with reference to FIGS. 12 through 14.

The DA area 2214 may directly communicate with an external tester through a conductive member provided on an outer surface of the memory 2200 in a test mode of the memory 2200. Various signals from the tester may be provided to the at least one core die 2220 through the DA area 2214 and the TSV area 2212. In a modified embodiment, various signals from the tester may be provided to the at least one core die 2220 through the DA area 2214, the PHY area 2213, and the TSV area 2212.

As described above, a neural network processor in a neural network system may reduce learning time, save power, reduce processing requirements, and otherwise reduce resource expenditures when performing learning. The processor may except one or more layers of the neural network from learning iterations based on determining that the one or more layers will not benefit from, or will not greatly benefit from, the learning iterations for which the one or more layers are excepted. The comparisons of weights such as distributions of weight values between iterations may be used as the basis for determining that the one or more layers will not benefit from, or will not greatly benefit from, additional learning iterations. As described for various embodiments, the comparisons of weights from different iterations may be made based on histogram information, statistics, or the raw data of the weight values in the weights. As one particular benefit, the neural network processor may reduce transfer learning time when weights from a trained neural network are used as the initial weights for another neural network to be trained, as layers with saturated weights from the trained neural network can be quickly detected based on the teachings herein. Accordingly, the amount of time required for training of a neural network to obtain learning results can be reduced based on the techniques for increasing learning speed described herein.

While the inventive concept(s) of the present disclosure have been particularly shown and described with reference to embodiments thereof, it will be understood that various changes in form and details may be made therein without departing from the spirit and scope of the following claims.

What is claimed is:

1. A neural network system, comprising:
a neural network processor configured to perform learning including multiple learning iterations on a plurality of layers, to determine at least one layer in which the learning is interrupted among the plurality of layers based on a result of comparing, for each of the plurality of layers, a distribution of first weight values resulting from a first learning iteration with a distribution of second weight values resulting from a second learning iteration subsequent to the first learning iteration, and to perform a third learning iteration subsequent to the second learning iteration on the plurality of layers except the at least one layer for which interruption of the learning has been determined among the plurality of layers; and a memory configured to store first distribution information regarding the distribution of the first weight values and second distribution information regarding the distribution of the second weight values and configured to provide the first distribution information and the second distribution information to the neural network processor when the second learning iteration is completed.

2. The neural network system of claim 1,
wherein the first distribution information includes first histogram information regarding the first weight values in each of the plurality of layers, the second distribution information includes second histogram information regarding the second weight values in each of the plurality of layers, and the neural network processor is configured to determine the at least one layer in which the learning is interrupted among the plurality of layers based on a difference between the first histogram information and the second histogram information in each of the plurality of layers.

3. The neural network system of claim 2,
wherein the neural network processor is configured to subtract the second histogram information from the first histogram information, to obtain a difference indicator value by adding up absolute values of values included in subtracted histogram information resulting from the subtraction, and to determine the interruption of the learning for a layer having the difference indicator value that is equal to or less than a threshold value.

4. The neural network system of claim 1,
wherein the first distribution information includes first statistic information regarding the first weight values in each of the plurality of layers, the second distribution information includes second statistic information regarding the second weight values in each of the plurality of layers, and the neural network processor is configured to determine the at least one layer in which the learning is interrupted among the plurality of layers based on a difference between the first statistic information and the second statistic information in each of the plurality of layers.

5. The neural network system of claim 4,
wherein the first statistic information includes at least one selected from a mean, a variance, a standard deviation, a maximum, and a minimum of the first weight values in each of the plurality of layers; the second statistic information includes at least one selected from a mean, a variance, a standard deviation, a maximum, and a minimum of the second weight values in each of the plurality of layers; and the neural network processor is configured to calculate a difference between the first statistic information and the second statistic information and to determine the interruption of the learning for a layer having the difference that is equal to or less than a threshold value.

6. The neural network system of claim 1,
wherein the memory includes a transfer learning management circuit configured to obtain the first distribution information based on the first weight values and store the first distribution information after the first learning iteration is completed and to obtain the second distribution information based on the second weight values and store the second distribution information after the second learning iteration is completed.

7. A learning method of a neural network system, which includes a plurality of learning iterations on a plurality of layers, the learning method comprising:

storing first weights resulting from an N-th learning iteration in a memory;

determining at least one layer in which learning is interrupted among the plurality of layers based on first weight values included in the first weights and second weight values included in second weights resulting from an (N−1)-th learning iteration; and performing an (N+1)-th learning iteration on the plurality of layers except the at least one layer for which interruption of the learning has been determined among the plurality of layers.

8. The learning method of claim 7,
wherein the determining of the at least one layer in which the learning is interrupted comprises determining the at least one layer in which the learning is interrupted among the plurality of layers based on a result of comparing first distribution information of the first weight values with second distribution information of the second weight values in each of the plurality of layers.

9. The learning method of claim 8,
wherein the first distribution information includes first histogram information regarding the first weight values in each of the plurality of layers, the second distribution information includes second histogram information regarding the second weight values in each of the plurality of layers, and the determining of the at least one layer in which the learning is interrupted further comprises determining the at least one layer in which the learning is interrupted among the plurality of layers based on a difference between the first histogram information and the second histogram information in each of the plurality of layers.

10. The learning method of claim 9,
wherein the determining of the at least one layer in which the learning is interrupted further comprises:

subtracting the second histogram information from the first histogram information;

obtaining a difference indicator value by adding up absolute values of values included in subtracted histogram information resulting from the subtraction; and determining the interruption of the learning for a layer having the difference indicator value that is equal to or less than a threshold value.

11. The learning method of claim 8,
wherein the first distribution information includes first statistic information regarding the first weight values in each of the plurality of layers, the second distribution information includes second statistic information regarding the second weight values in each of the plurality of layers, and the determining of the at least one layer in which the learning is interrupted further comprises determining the at least one layer in which the learning is interrupted among the plurality of layers based on a difference between the first statistic information and the second statistic information in each of the plurality of layers.

12. The learning method of claim 11,
wherein the first statistic information includes at least one selected from a mean, a variance, a standard deviation, a maximum, and a minimum of the first weight values in each of the plurality of layers; the second statistic information includes at least one selected from a mean, a variance, a standard deviation, a maximum, and a minimum of the second weight values in each of the plurality of layers; and the determining of the at least one layer in which the learning is interrupted further comprises calculating a difference between the first statistic information and the second statistic information and determining the interruption of the learning for a layer having the difference that is equal to or less than a threshold value.

13. The learning method of claim 8, further comprising:
generating the first distribution information based on the first weight values using a transfer learning management circuit included in the memory after an N-th learning iteration ends; and storing the first distribution information in the transfer learning management circuit.

14. The learning method of claim 13,
wherein the memory includes at least one memory device, the at least one memory device has a structure in which at least one core die is stacked on a buffer die, and the transfer learning management circuit is implemented in the buffer die.

15. The learning method of claim 13,
further comprising providing the first distribution information and the second distribution information to a neural network processor using the memory after the N-th learning iteration ends, the first distribution information and the second distribution information having been stored in the transfer learning management circuit, wherein the determining of the at least one layer in which the learning is interrupted is performed by the neural network processor.

16. The learning method of claim 13,
further comprising:
providing the first distribution information and the second distribution information to a processor using the memory after the N-th learning iteration ends, the first distribution information and the second distribution information having been stored in the transfer learning management circuit;

performing the determining of the at least one layer in which the learning is interrupted, using the processor; and providing a neural network processor with information about the at least one layer, for which the interruption of the learning has been determined, using the processor.

17. A transfer learning method of a neural network processor, which includes a plurality of learning iterations on a plurality of layers, the transfer learning method comprising:

storing first weight values resulting from a first learning iteration in a memory outside the neural network processor;

storing second weight values resulting from a second learning iteration in the memory, the second learning iteration subsequent to the first learning iteration;

receiving first distribution information of the first weight values and second distribution information of the second weight values from the memory and determining at least one layer in which the learning is interrupted among the plurality of layers based on the first distribution information and the second distribution information; and performing a third learning iteration on the plurality of layers except the at least one layer for which interruption of the learning has been determined among the plurality of layers.

18. The transfer learning method of claim 17,
wherein the first distribution information includes first histogram information regarding the first weight values in each of the plurality of layers, the second distribution information includes second histogram information regarding the second weight values in each of the plurality of layers, and the determining of the at least one layer in which the learning is interrupted further comprises determining the at least one layer in which the learning is interrupted among the plurality of layers based on a difference between the first histogram information and the second histogram information in each of the plurality of layers.

19. The transfer learning method of claim 18,
wherein the determining of the at least one layer in which the learning is interrupted further comprises:

subtracting the second histogram information from the first histogram information;

obtaining a difference indicator value by adding up absolute values of values included in subtracted histogram information resulting from the subtraction; and determining the interruption of the learning for a layer having the difference indicator value that is equal to or less than a threshold value.

20. The transfer learning method of claim 17,
wherein the first distribution information includes first statistic information regarding the first weight values in each of the plurality of layers, the second distribution information includes second statistic information regarding the second weight values in each of the plurality of layers, and the determining of the at least one layer in which the learning is interrupted comprises determining the at least one layer in which the learning is interrupted among the plurality of layers based on a difference between the first statistic information and the second statistic information in each of the plurality of layers.

* * * * *